(12) United States Patent
Richards et al.

(10) Patent No.: US 10,061,073 B2
(45) Date of Patent: Aug. 28, 2018

(54) CIRCULAR BACKLIGHT FOR A LIQUID CRYSTAL DISPLAY

(71) Applicant: Oculus VR, LLC, Menlo Park, CA (US)

(72) Inventors: Evan M. Richards, Santa Clara, CA (US); Shizhe Shen, San Mateo, CA (US); Jianru Shi, Union City, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/411,445

(22) Filed: Jan. 20, 2017

(65) Prior Publication Data

US 2018/0210134 A1    Jul. 26, 2018

(51) Int. Cl.
*F21V 8/00* (2006.01)
*G06F 3/01* (2006.01)
*G02F 1/1335* (2006.01)

(52) U.S. Cl.
CPC ......... *G02B 6/0053* (2013.01); *G02B 6/0036* (2013.01); *G02B 6/0046* (2013.01); *G02B 6/0055* (2013.01); *G02B 6/0061* (2013.01); *G02B 6/0068* (2013.01); *G02B 6/0073* (2013.01); *G02F 1/133621* (2013.01); *G06F 3/012* (2013.01); *G06F 3/013* (2013.01); *G02F 2201/56* (2013.01)

(58) Field of Classification Search
CPC .................................................. G02F 2201/56
See application file for complete search history.

(56) References Cited

U.S. PATENT DOCUMENTS

| | | | |
|---|---|---|---|
| 2012/0106198 A1* | 5/2012 | Lin | G02B 6/0083 362/609 |
| 2017/0097614 A1* | 4/2017 | Kang | G02B 6/0068 |
| 2017/0351019 A1* | 12/2017 | Kadowaki | G02B 6/0055 |

FOREIGN PATENT DOCUMENTS

JP    WO 2016104348 A1 *   6/2016   ............... F21S 2/00

* cited by examiner

*Primary Examiner* — Kendrick Hsu
(74) *Attorney, Agent, or Firm* — Fenwick & West LLP

(57) ABSTRACT

A liquid crystal display (LCD) device including a circular backlight that illuminates an LCD panel. The backlight is disposed behind the LCD panel and includes a light guide and an array of light emitting diodes (LEDs). The light guide includes a circular top surface, a circular bottom surface, and a connecting surface between the top and bottom surface. The array of LEDs are disposed along the connecting side surface of the light guide in a circular arrangement to emit light into in first directions toward a center of the light guide. The light guide receives the light from the array of LEDs in the first directions and directs the light in a second direction toward the LCD panel from the circular top surface. The backlight can include brightness enhancement films (BEFS), such as first BEF having concentric circular stripe prisms, and a second BEF having radial stripe prisms.

20 Claims, 13 Drawing Sheets

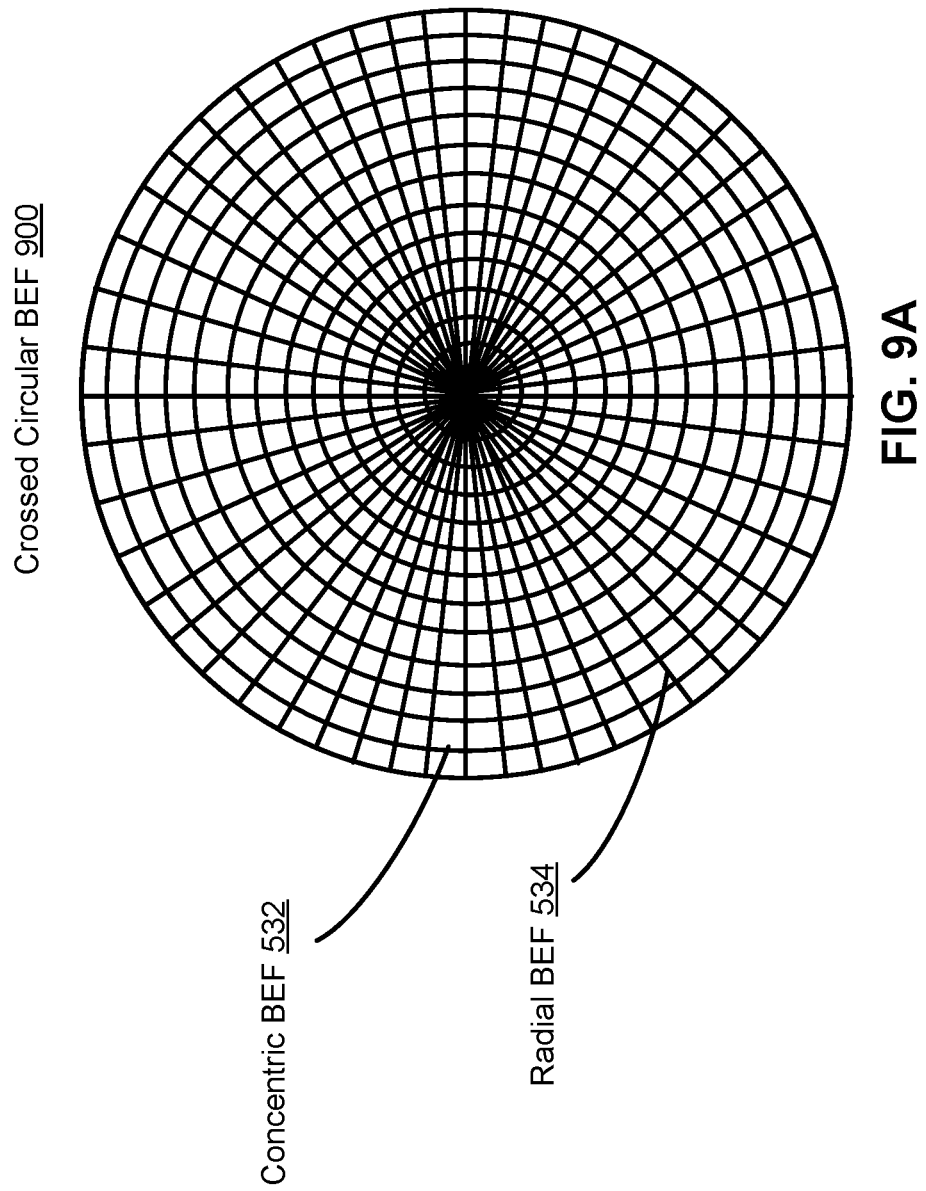

CIRCULAR BACKLIGHT FOR A LIQUID CRYSTAL DISPLAY

BACKGROUND

Head-mounted displays (HMDs) use electronic displays to provide content to users, such as content for virtual reality (VR), augmented reality (AR), or mixed reality (MR) applications. The light emitted from the electronic display may be passed through an optics block including optical elements (e.g., lenses) that adjust the focal distance between the electronic display and the user's eye. The optical elements of the optics block tend to have heavy amounts of distortion at the wide field angles, which makes utilization of the corners of a rectangular electronic display undesirable in the HMD.

SUMMARY

A liquid crystal display (LCD) device including a circular backlight that illuminates an LCD panel. The backlight is disposed behind the LCD panel and includes a light guide and an array of light emitting diodes (LEDs). The light guide includes a circular top surface, a circular bottom surface, and a connecting surface between the top and bottom surface. The array of LEDs are disposed along the connecting side surface of the light guide in a circular arrangement to emit light into in first directions toward a center of the light guide, the light guide receiving the light from the array of LEDs in the first directions and directs the light in a second direction toward the LCD panel from the circular top surface.

In some embodiments, the LCD panel has a circular profile shape corresponding with a shape of the circular top surface of the light guide to receive the light in the second direction from the circular top surface.

In some embodiments, the backlight includes one or more brightness enhancement films (BEFs). For example, the BEFs may be disposed between the light guide and the LCD panel, and may include a first BEF having concentric circular stripe prisms, and a second BEF having radial stripe prisms. The BEFs may have a circular profile shape corresponding with the shape of the circular top surface of the light guide.

Some embodiments may include head-mounted display (HMD) including a first circular LCD device and a second circular LCD device. Each of the first and second circular LCD devices includes a circular LCD panel, and a backlight having a circular light guide and an array of LEDs disposed along the connecting side surface of the light guide. The first and second circular LCD devices are arranged adjacent to each other within a front rigid body of the HMD. The first LCD device present video data to a user's left eye and the second LCD device presents video data to the user's right eye. The first and second LCD devices form open regions to accommodate placement of other HMD components, the user's nose, etc.

BRIEF DESCRIPTION OF THE DRAWINGS

FIGS. 9A and 9B respectively show top and side views of a crossed circular BEF, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Techniques for providing circular electronic displays optimized for head-mounted displays (HMD) are discussed herein. An electronic display can include a circular LCD panel and a backlight to illuminate the LCD panel. The backlight includes a circular light guide, LEDs arranged around the circular light guide, and one or more BEF layers that increase the brightness of light output from the light guide. The BEF layers include a first BEF having concentric circular stripe prisms, and a second BEF having radial stripe prisms.

As discussed above, utilization of the corners of a rectangular electronic display undesirable in HMDs because optical elements within the HMD can create distortion at the wide field angles. The circular electronic displays discussed herein lack the corner regions of rectangular displays. When two circular electronic displays are placed in the front rigid body or other housing of an HMD (e.g., adjacent to each other), the circular electronic displays form open regions in the front rigid body to accommodate placement of other HMD components, the user's nose, etc.

System Overview

Figure 1:
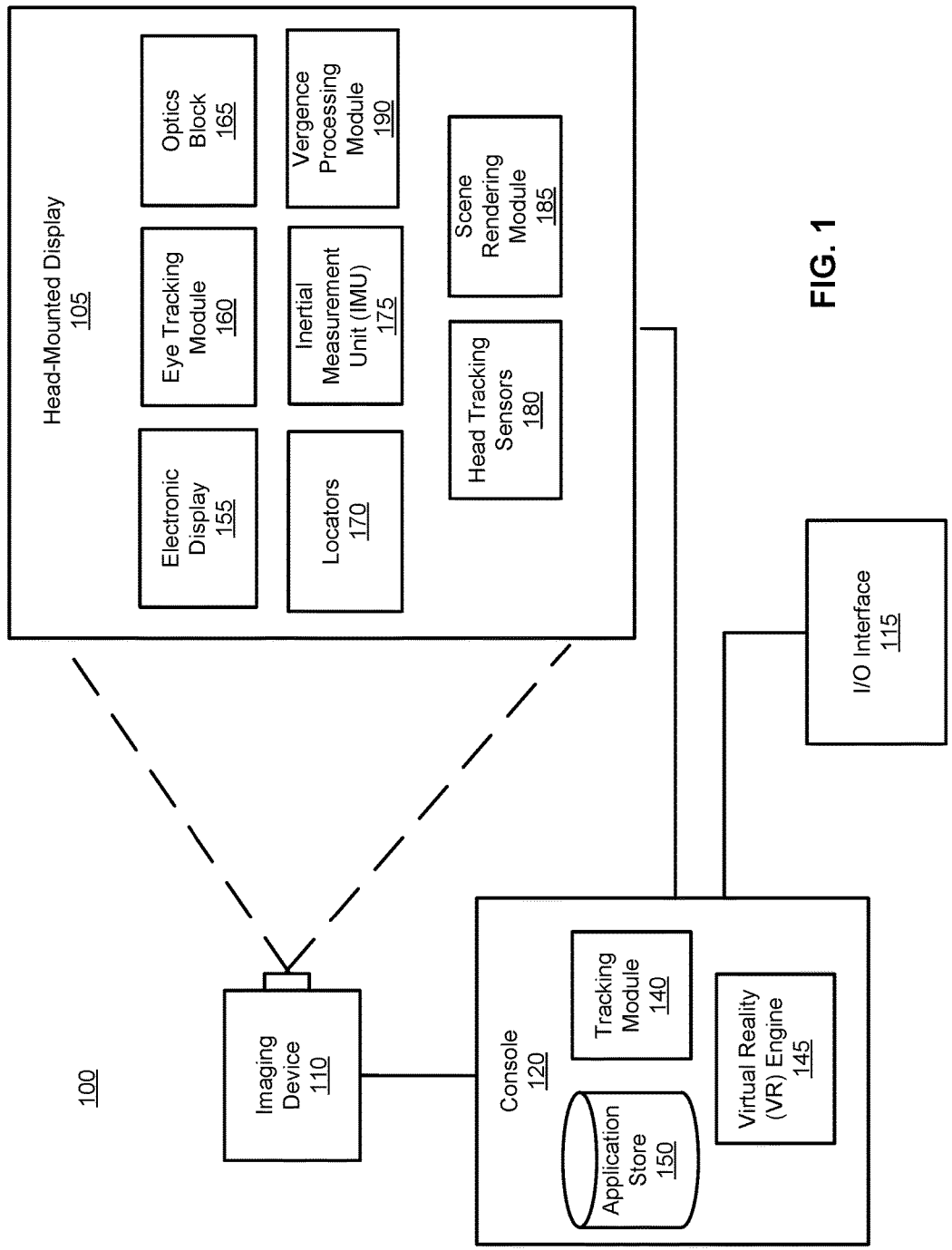
FIG. 1 shows a system, in accordance with some embodiments.

FIG. 1 shows a system 100 including a head-mounted display (HMD). The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof.

Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

The electronic display 155 includes an LCD device including a LCD panel and a backlight. The backlight includes LED assemblies with dichroic combiners and color LEDS. The dichroic combiner combines light from different colored LEDs, and provides the combined light to a light guide of the backlight for illuminating the LCD panel. As discussed in greater detail below, the dichroic combiner allows multiple LEDs to provide edge-lighting for the backlight, without requiring the LEDs to be arranged along an edge of the LD panel. The LEDs may be placed in other locations within a display device and/or HMD to improve parameters such as device size, shape, aesthetics, weight distribution, etc.

The optics block 165 adjusts its focal length responsive to instructions from the console 120. In some embodiments, the optics block 165 includes a multi multifocal block to adjust a focal length (adjusts optical power) of the optics block 165

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 215 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g. information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 165 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
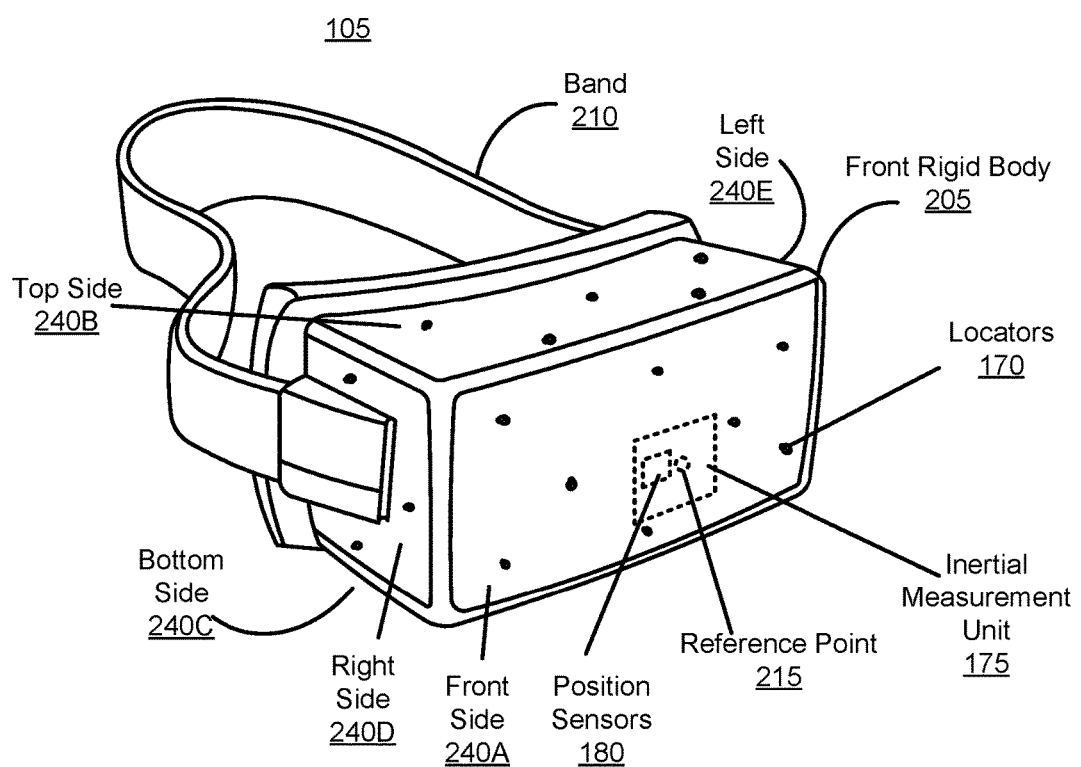
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 175 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
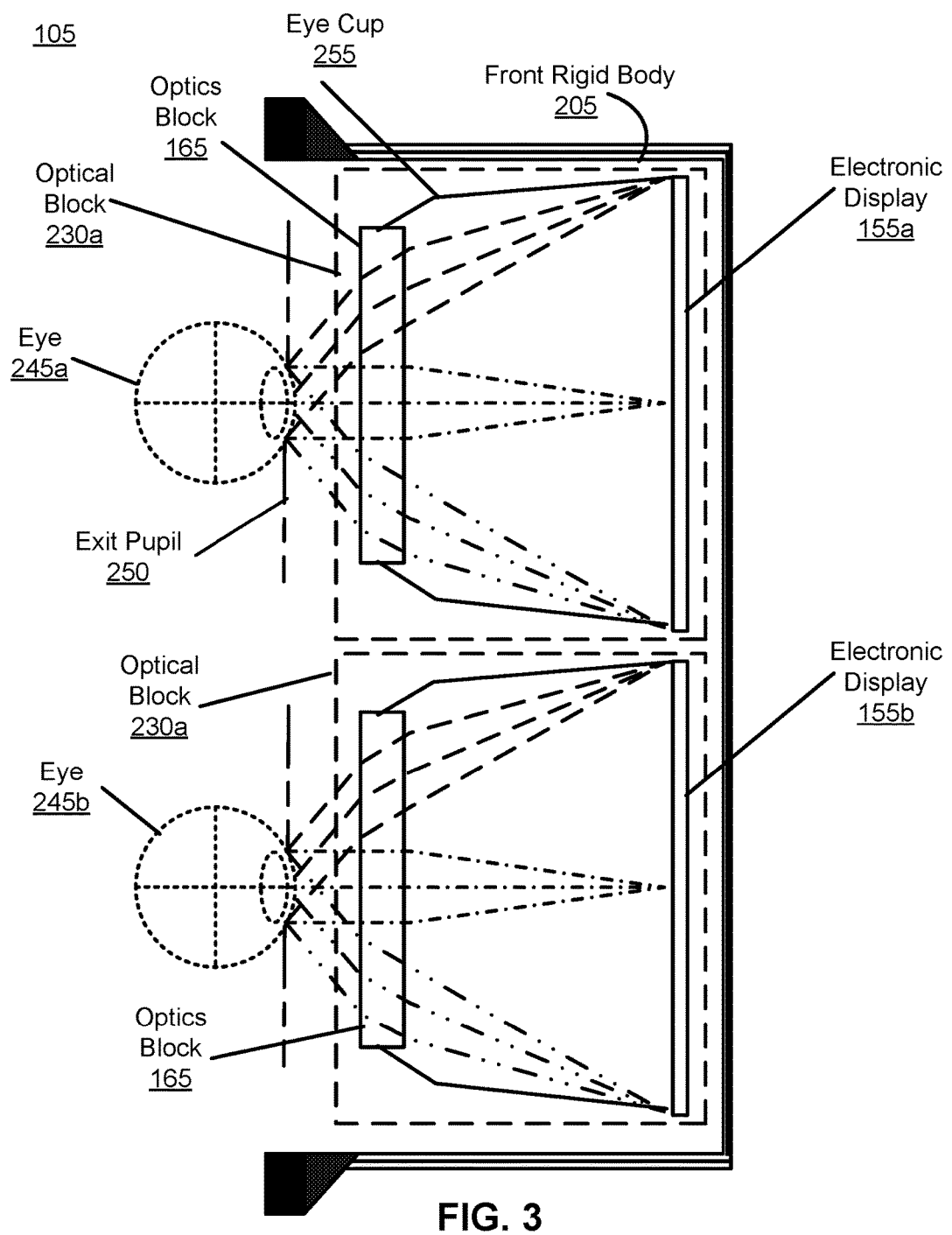
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes an optical block 230a and an optical block 230b. The optical block 230a includes an electronic display 155a to provide images for a first eye 245a of the user. The optical block 230b includes an electronic display 155b to provide images for a second eye 245b of the user. The optical block 230a will now be discussed in greater detail with the discussion being applicable to the optical block 230b.

The optical block 230a provides altered image light to an exit pupil 250. The exit pupil 250 is the location in the front rigid body 205 where the user's eye 245a is positioned. The optical block 230a includes the electronic display 155a, an optics block 165, and an eye cup 255. The eye cup 255 is mechanically secured with the front rigid body 205, and holds the optics block 165. The electronic display 155a emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cone 255 may be omitted from the optical block 230.

When the user wears the HMD 105, the user's noise is positioned between the two optical blocks 230a and 230b. The electronic displays 155a and 155b may each be circular displays (e.g., rather than rectangular) to provide space for other components and/or the user's noise between the electronic displays 155a and 155b. Furthermore, circular electronic displays are advantageous for the HMD 105 because the optics block 165, including optical elements such as lenses, can create distortion at the wide field angles. As such, utilization of rectangular display corners may be undesirable for HMDs.

Figure 4:
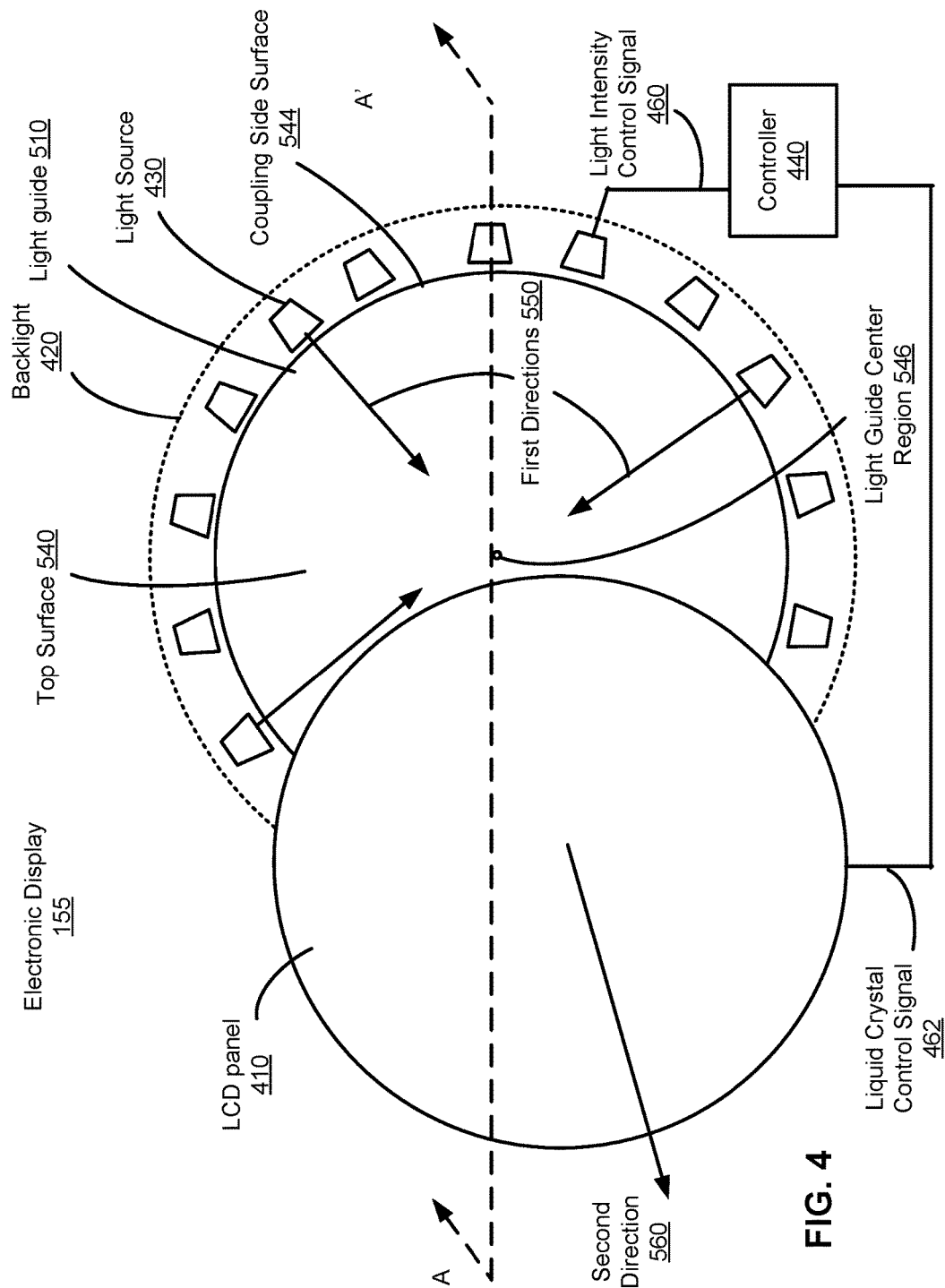
FIG. 4 shows an exploded front view of an electronic display, in accordance with some embodiments.

FIG. 4 shows an exploded front view of an example of a circular electronic display 155 (hereinafter "electronic display 155"). Although the HMD 105 may include various types of circular displays, the circular electronic display 155 in this embodiment is a LCD device including a liquid crystal display (LCD) panel 410, a circular backlight 420 (hereinafter "backlight 420"), and a controller 440. The backlight 420 emits light towards the exit pupil 250 through the LCD panel 410 in a direction 560. The LCD panel 410 is disposed between the backlight 420 and the exit pupil 250, and controls an amount of light from the backlight 420 to pass through in the direction 560 on a per pixel basis. A space between the LCD panel 410 and the backlight 420 may be vacuum or filled with transparent material. In other embodiments, the electronic display 155 includes different, or fewer components than shown in FIG. 4.

The backlight 420 includes a circular light guide 510 (or "light guide 510") and an array of light sources 430 that generate light. The light sources 430 include white color LEDs. In some embodiments, the light sources 430 include LEDs of different color or spectrum intensities (e.g., R, G, and B) that can be separately controlled and optimized to desired spectrum intensities and emission response times. The spectrum intensity of each LED of the light sources 430 may be chosen to collectively produce combined light having wider color gamut and/or brightness than white light from white LEDs.

The intensity (e.g. over time) of light from a light source 430 is adjusted according to a light intensity control signal 460 from the controller 440. In some embodiments, the backlight 420 may be a strobed backlight where LEDs are switched on and off over time (e.g., according to a duty cycle). The light intensity control signal 460 is a signal indicative of intensity of light to be output for each light source 430. Different colored light sources 430 can output corresponding light with different intensity, according to the light intensity control signal.

Figure 5:
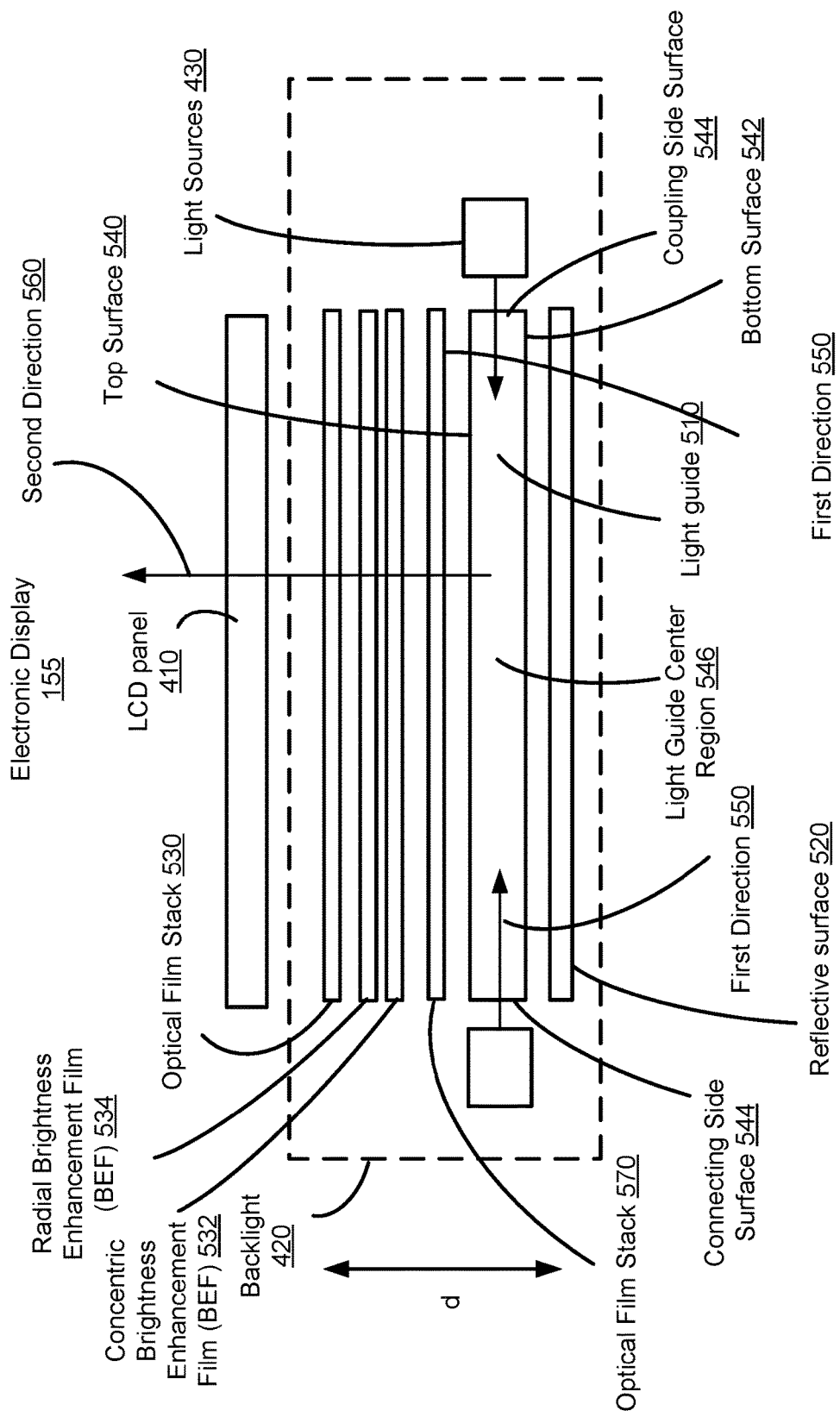
FIG. 5 shows a cross sectional side view of the electronic display, in accordance with some embodiments.

FIG. 5 shows a cross sectional side view of the electronic display 155, in accordance with some embodiments. The cross sectional side view is taken along line A-A' for the electronic display 155 as shown in FIG. 4. The backlight 420 is disposed behind the LCD panel along a depth dimension d. The backlight 420 includes the light sources 430, the circular light guide 510, a reflective surface 520, an optical film stack 530, an optical film stack 570, and brightness enhancement films (BEFs) 532 and 534.

With reference to FIGS. 4 and 5, the circular light guide 510 includes a circular top surface 540, a circular bottom surface 542, and a connecting side surface 544 defined between the circular top surface 540 and the circular bottom surface 542. The connecting side surface 544 defines the light coupling region of the circular light guide 510 with the light sources 430. An array of light sources 430 are arranged along the connecting side surface 544 in a circular arrangement to emit light into the connecting side surface 544 toward the center region 546 of the circular light guide 510. The light is emitted from the light sources 430 in the first directions 550 to the connecting side surface 544, and then toward the center region 546. While the light is propagating within the light guide 510, the light guide 510 directs the light in second directions 560 from the top surface 540 to the circular LCD panel 410. The circular backlight 520 may distribute the light uniformly across the pixels of the circular LCD panel 410.

The circular light guide 510 may be composed of a glass material or a transparent plastic material (e.g., Poly(methyl methacrylate) (PMMA)). As discussed in greater detail below in connection with FIG. 6, the light guide may further include light extraction features that facilitate receiving light from the light sources 430 in the first directions 550 toward the center of the circular light guide 510 and projecting the light towards the LCD panel 410 in the second direction 560.

In some embodiments, the light guide 510 receives light with different colors from the light sources 430, and directs combined light including a combination of the different colors toward the LCD panel 410 to illuminate the LCD panel 410. The combined light provides controllable spectrum intensity across different wavelengths.

The light sources 430 may include a plurality of LEDs disposed along the connecting side surface 544 of the circular light guide 510. The light sources 430 emit light toward the center of the circular light guide 510 to provide edge-lighting for the backlight 420.

The optical film stack 530 may be disposed between the light guide 510 and the LCD panel 410. The optical film stack 530 may include a diffuser that facilitates the uniform distribution of light from the light guide 510 across the pixels of the LCD panel 410. The optical film stack 570 also includes a diffuser. In some embodiments, the optical film stack 570 is omitted. In addition or alternative to diffusers, the optical film stacks 530 and 570 may include a reflective polarizer film that reflects unpolarized light back toward the LCD panel 410 that would otherwise be absorbed.

The light guide 510 directs light towards its top and bottom surfaces, where the top surface faces the LCD panel 410 and the bottom surface faces the reflective surface 520. The reflective surface 520 includes an optical mirror that reflects light directed from the bottom surface of the light guide 510 towards the LCD panel 410.

The backlight 520 further includes one or more BEF layers, such as the concentric BEF 532 and the radial BEF 534. BEFs include stripe prisms that control the intensity of light as a function of angle and recycle light through the system to increase the brightness of light directed toward the LCD panel 410 from the light guide 510. As discussed in greater detail below in connection with FIGS. 7A through 9B, the concentric BEF 532 includes concentric stripe prisms, and the radial BEF 534 includes radial stripe prisms. The concentric BEF 532 and the radial BEF 534 are stacked on top of each other to form a crossed circular BEF. Here, the stripe prisms of the concentric BEF 532 and the radial BEF 534 cross (e.g., at approximately 90 degrees) with respect to each other. The use of the crossed concentric BEF 532 and the radial BEF 534 increases light intensity more than the use of a single BEF layer. For example, a single BEF layer may provide around 40-60% increase in brightness of light output from the light guide 510, while the crossed circular BEF may provide over 100% increase in brightness of light output from the light guide 510. In some embodiments, the concentric BEF 532 and the radial BEF 534 are circular BEF layers to match the shape of the circular backlight 420. Similarly, the reflective surface 520 and optical film stack 530 may be circular layers.

Returning to FIG. 4, the LCD panel 410 receives a liquid crystal control signal 462 from the controller 440, and passes light from the backlight 420 towards the exit pupil in the second direction 560, according to the liquid crystal control signal 462. The liquid crystal control signal 462 is a signal indicative of an amount of light to be passed through a liquid crystal layer of the LCD panel 410 for different pixels. The LCD panel 410 includes a plurality of liquid crystals, and an orientation of the liquid crystals can be changed according to the light crystal control signal applied across electrodes of the liquid crystal layer.

The controller 440 is a circuitry that receives an input image data, and generates control signals for driving the LCD panel 410 and the LED light sources 430. The input image data may correspond to an image or a frame of a video in a virtual reality and/or augmented reality application. The controller 440 generates the light intensity control signal 460 for controlling intensity of light output by the light sources 430. In addition, the controller 440 generates the liquid crystal control signal 460 to determine an amount of light passing from the backlight 420 towards the exit pupil 250 through the LCD panel 410 according to the input image data. The controller 440 provides the light intensity control signal 460 to the light sources 430, and the liquid crystal control signal 462 to the liquid crystal layer 410 at a proper timing to display images.

Figure 6:
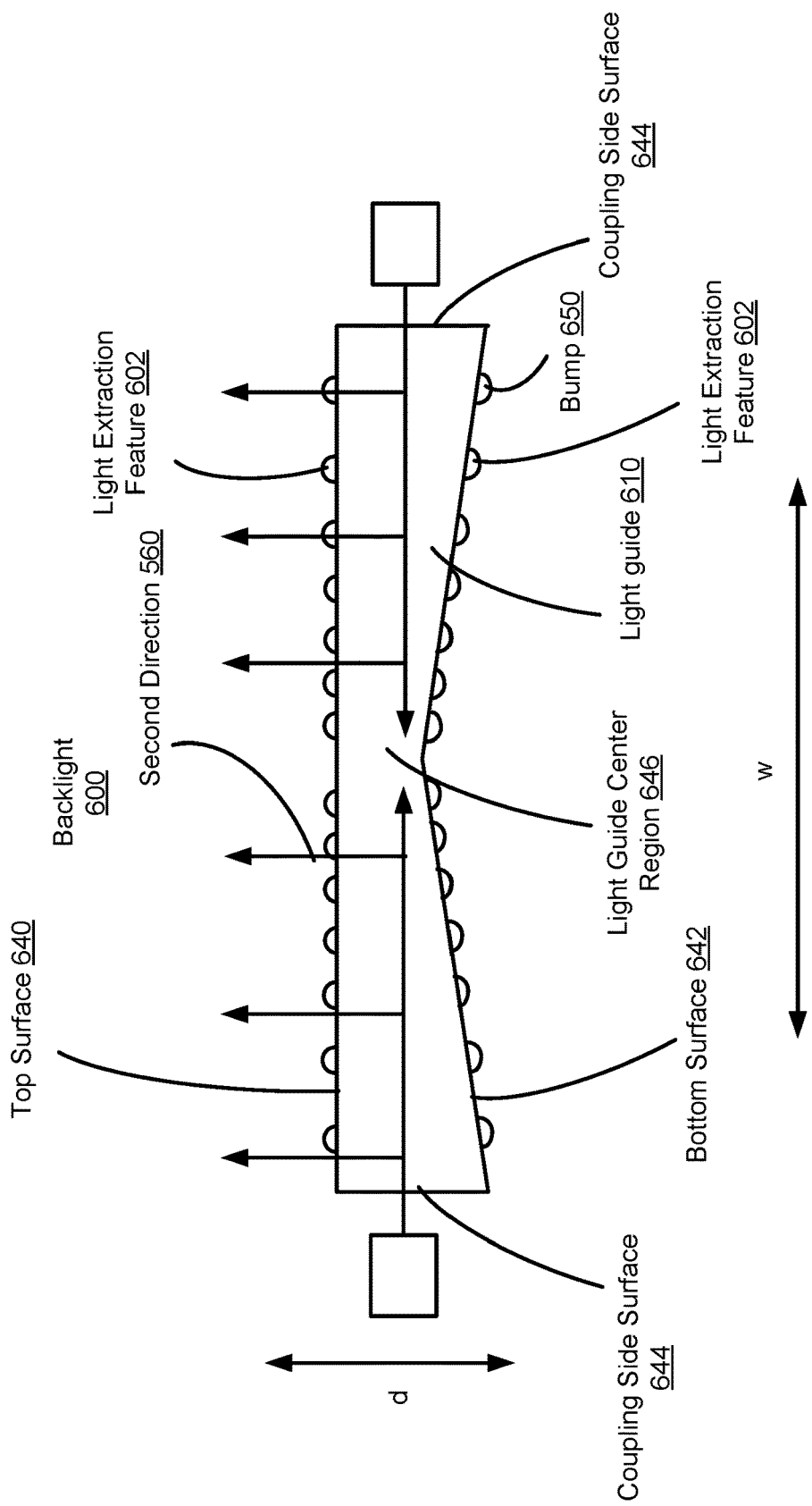
FIG. 6 shows a cross sectional side view of a circular backlight, in accordance with some embodiments.

FIG. 6 shows a cross sectional side view of a circular backlight 600, in accordance with some embodiments. The circular backlight 600 includes a light guide 610 having a variable thickness along the dimension d and light extraction features 602 on the top surface 640 and bottom surface 642 of the light guide 610. To provide for uniform light distribution to the LCD panel across the width dimension w of the light guide 610, the thickness of the light guide decreases from the connecting side surface 644 toward the light guide center region 646. The thickness of the circular light guide 610 thus changes as a function of distance from the light guide center region 646 to the connecting side surface 644. The change in thickness is provided through a sloped bottom surface 642, with the top surface 640 that faces the LCD panel being flat to uniformly direct light toward the LCD panel in the second direction 560.

The light extraction features 602 include a series of unevenly spaced bumps 650 that diffuse propagating light. The density of the bumps 650 increase with distance to the light sources 430 according to a diffusion equation. Put another way, the density of the bumps 650 increase from the connecting side surface 644 to the center of the circular light guide 646. The light extraction features 602 may be located on the top surface 640 and/or the bottom surface 642 of the circular light guide 610. In some embodiments, some or all of the light extraction features include dimples on the surface of the circular light guide 646 rather than protruding bumps.

In some embodiments, a circular backlight may include a variable thickness without light extraction features. Alternatively, a circular backlight may include light extraction features without a variable thickness light guide. When the circular backlight includes light extraction features, the light extraction features may be located on the top surface 640, the bottom surface 642, or both.

Figure 7A:
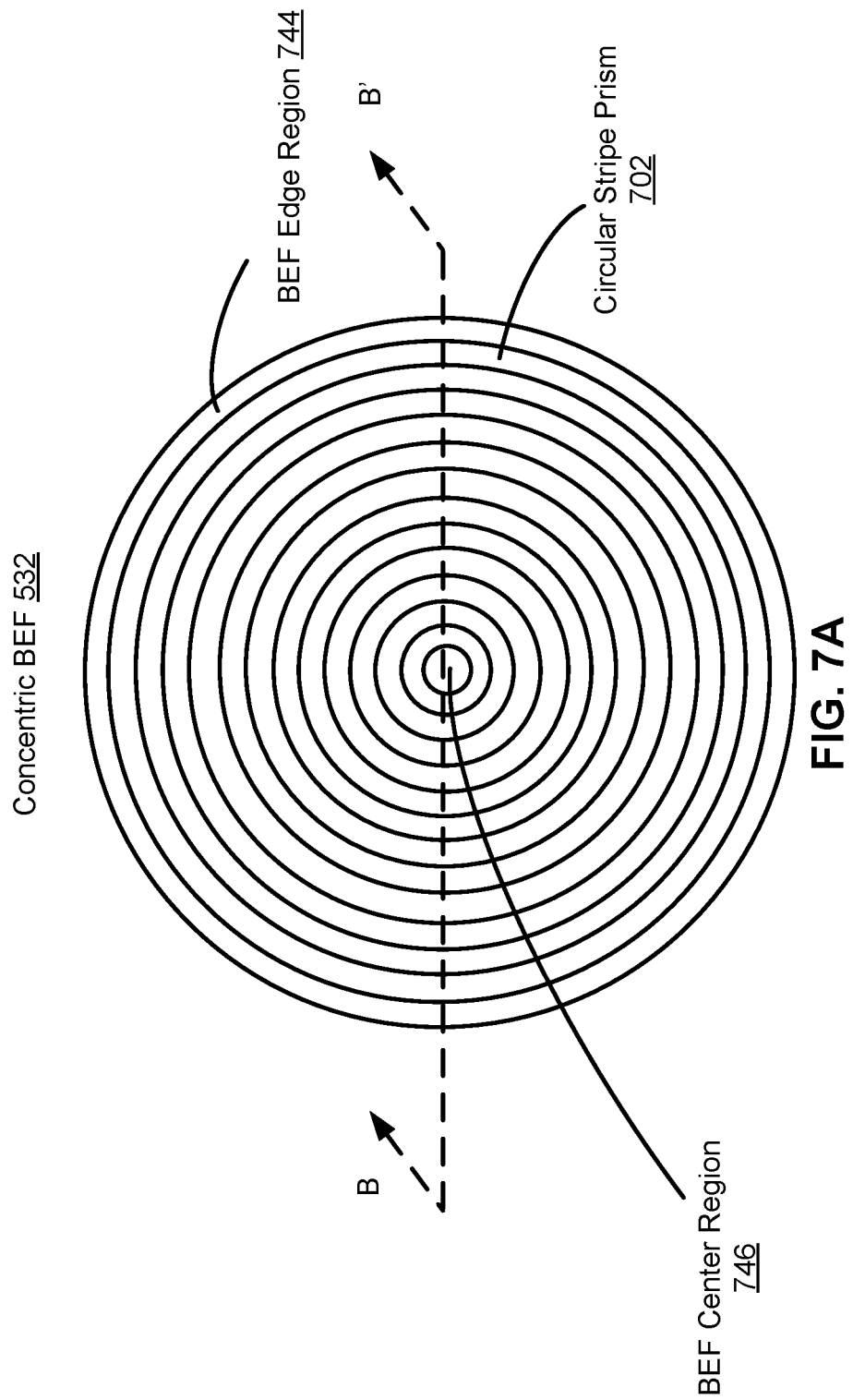
FIGS. 7A and 7B show a concentric brightness enhancement film (BEF), in accordance with some embodiments.
Figure 7B:
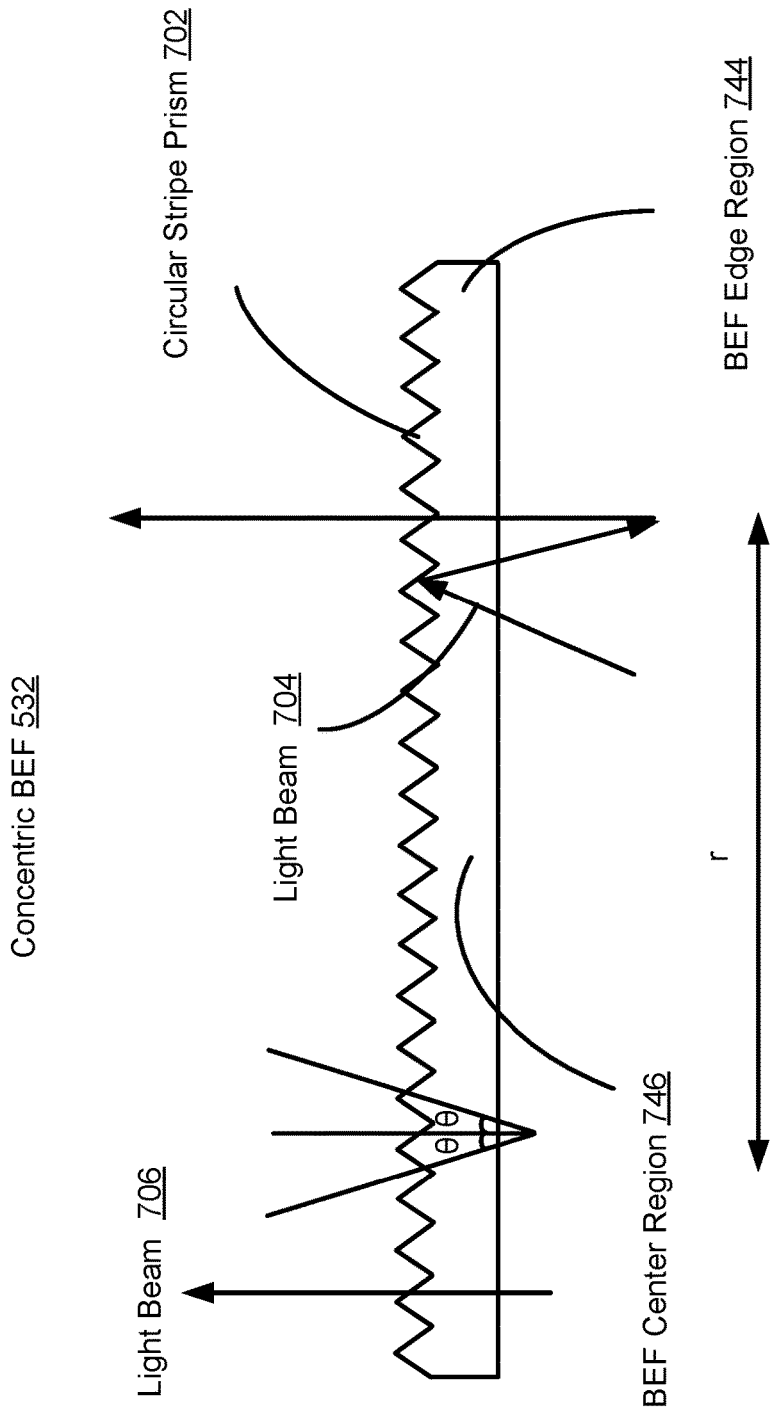

FIGS. 7A and 7B respectively show a top view and a cross sectional side view of a concentric brightness enhancement film (BEF) 532, in accordance with some embodiments. The concentric BEF 532 includes multiple circular stripe prisms 702. The stripe prisms 702 increase in radial size from the BEF center region 746 to the BEF edge region 744 to form a pattern of concentric circles around the BEF center region 746.

The cross sectional side view of the concentric BEF 532 in FIG. 7B is taken along the line B-B' shown in FIG. 7A. Each stripe prism 702 has a triangular prism shaped cross section that utilizes refraction and reflection of light to increase backlight efficiency. When light from the backlight reaches the stripe prisms 702 outside of a critical angle θ, as shown by light beam 704, the stripe prisms 702 cause total internal reflection of the light beam 704. The light beam 704 is reflected back toward the light guide and is recycled until the light beam 704 reaches the stripe prisms 702 within the critical angle and is refracted toward the LCD panel. In another example, the light beam 706 reaches the strip prisms 702 within the critical angle θ and is refracted toward the LCD panel (e.g., without reflection). As such, the concentric BEF 532 increases the intensity of light from the backlight that is directed toward the LCD panel within the critical angle θ. The concentric BEF 532 redirects beams that deviate outside of the critical angle θ along radial dimensions r defined from the BEF center region 746 to the BEF edge region 744 along the periphery of the concentric BEF 532.

Figure 8A:
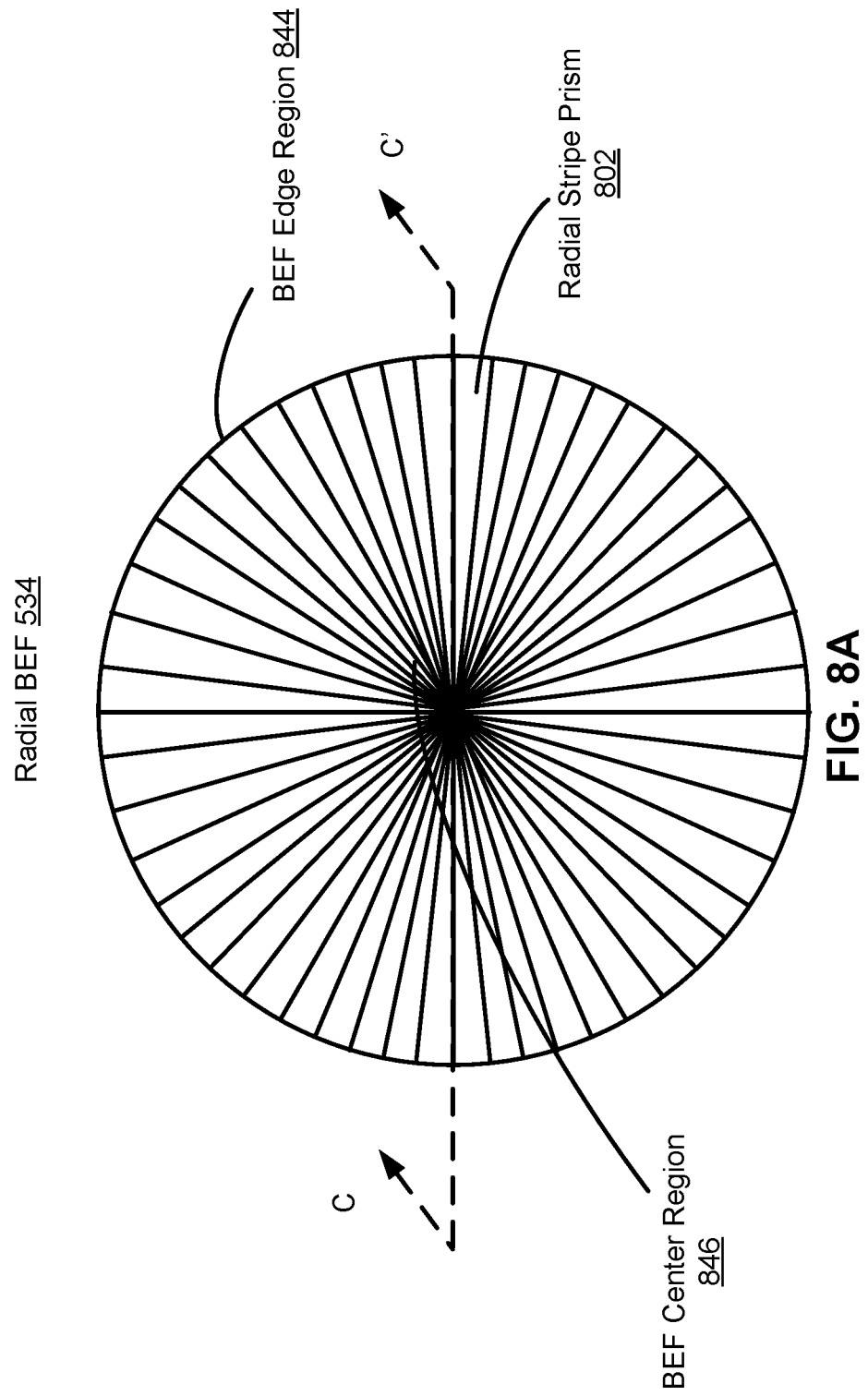
FIGS. 8A and 8B show a radial BEF, in accordance with some embodiments.
Figure 8B:
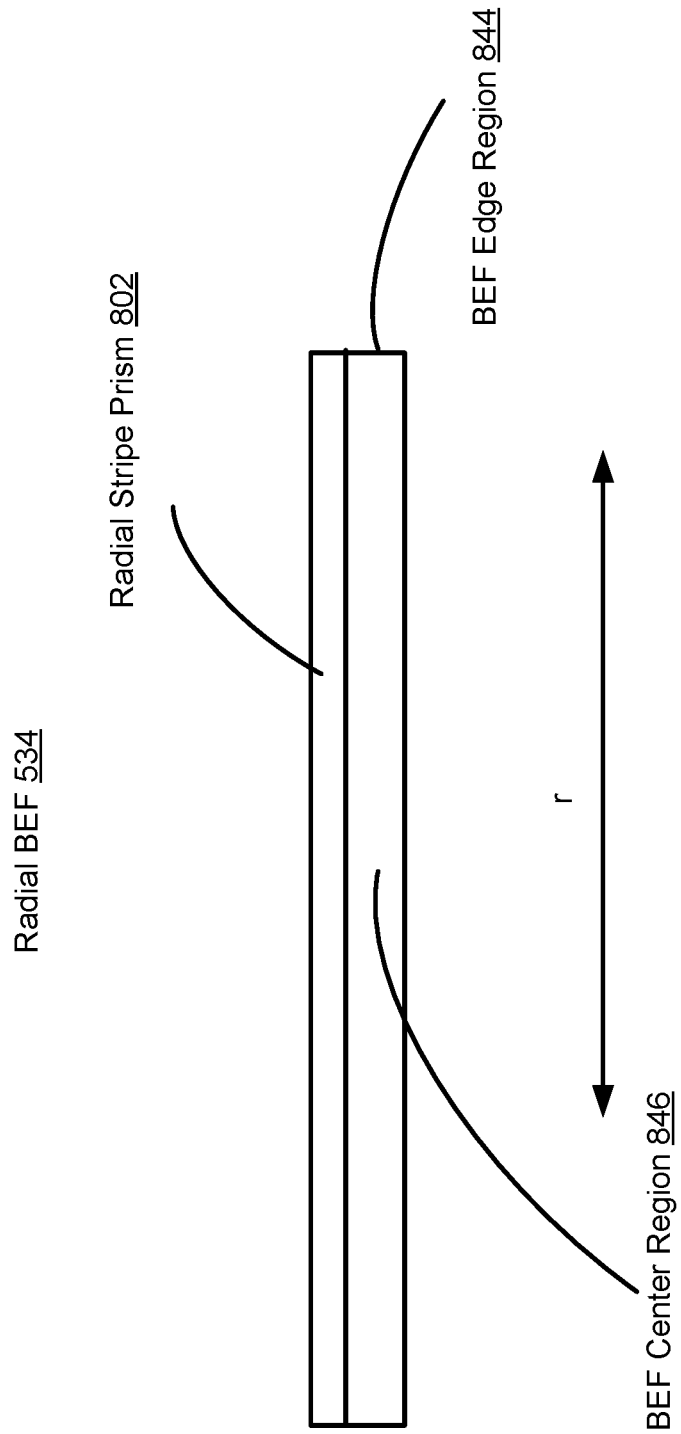

FIGS. 8A and 8B respectively show a top view and a cross sectional side view of a radial brightness enhancement film (BEF) 534, in accordance with some embodiments. The radial BEF 534 includes multiple radial stripe prisms 802. The stripe prisms 802 run from the BEF center region 846 to the BEF edge region 844, and form a spoke pattern defined around the BEF center region 846. The width of each stripe prism 804 may increase from the BEF center region 746 to the BEF edge region 744.

The cross sectional view of the radial BEF 534 in FIG. 8B is taken along the line C-C' shown in FIG. 8A. Each stripe prism 802 has a triangular prism shaped cross section that utilizes refraction and reflection of light to increase backlight efficiency in a manner similar to the stripe prisms 702 of the concentric BEF 532 as discussed above. The radial BEF 534 redirects beams that deviate outside of a critical angle along dimensions tangential to the radial dimensions r defined from the BEF center region 846 to the BEF edge region 844 along the periphery of the radial BEF 534. Put another way, the radial BEF 534 redirects light beams that deviate outside of a first critical angle along a first dimension and the concentric BEF 532 redirects light beams that deviate outside of a second critical again along a second dimension that is tangential to the first dimension.

Figure 9B:
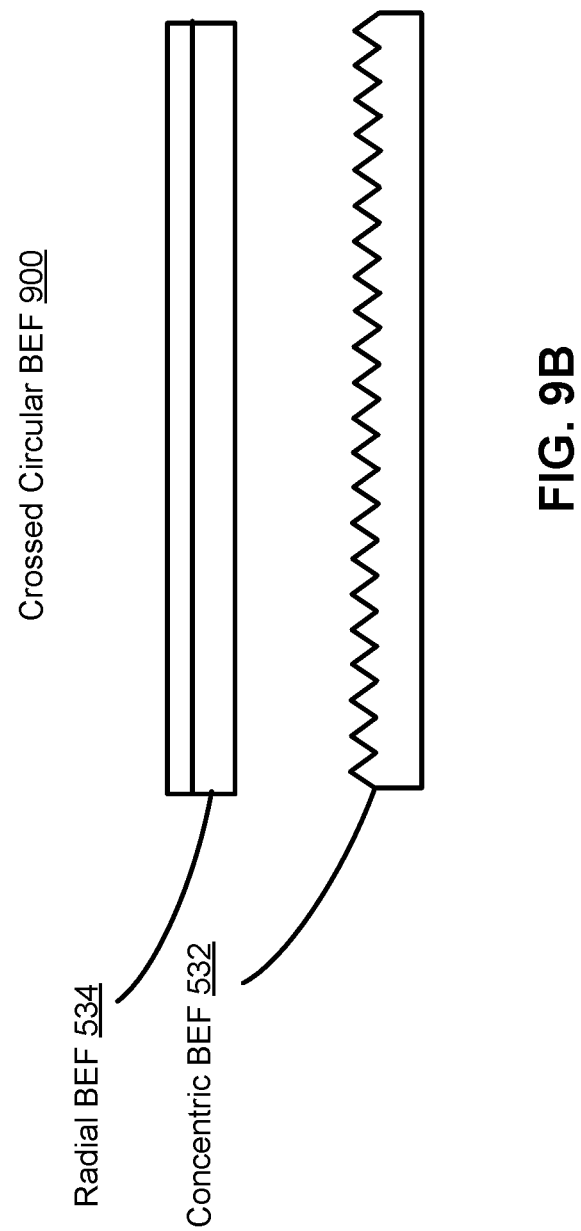

FIGS. 9A and 9B respectively show a top view and a cross sectional side view of a crossed circular BEF 900, in accordance with some embodiments. The crossed circular BEF 900 includes the concentric BEF 532 stacked with the radial BEF 534. In FIG. 9B, the radial BEF 345 is on top of the concentric BEF 532. In other examples, the radial BEF 345 is below the concentric BEF 532. When stacked and viewed from the top view as shown in FIG. 9A, the circular stripe prisms of the concentric BEF 532 intersect the radial stripe prisms of the radial BEF 534 at approximately 90 degrees. As discussed above, the concentric BEF 532 stacked with the radial BEF 534 redirects light beams traveling outside of critical angles along tangential dimensions, thereby increasing the overall intensity of light directed within each critical angle of the concentric BEF 532 and the radial BEF 534. The crossed circular BEF 900 can provide an over 100% increase in brightness of light output from the light guide 510.

Figure 10:
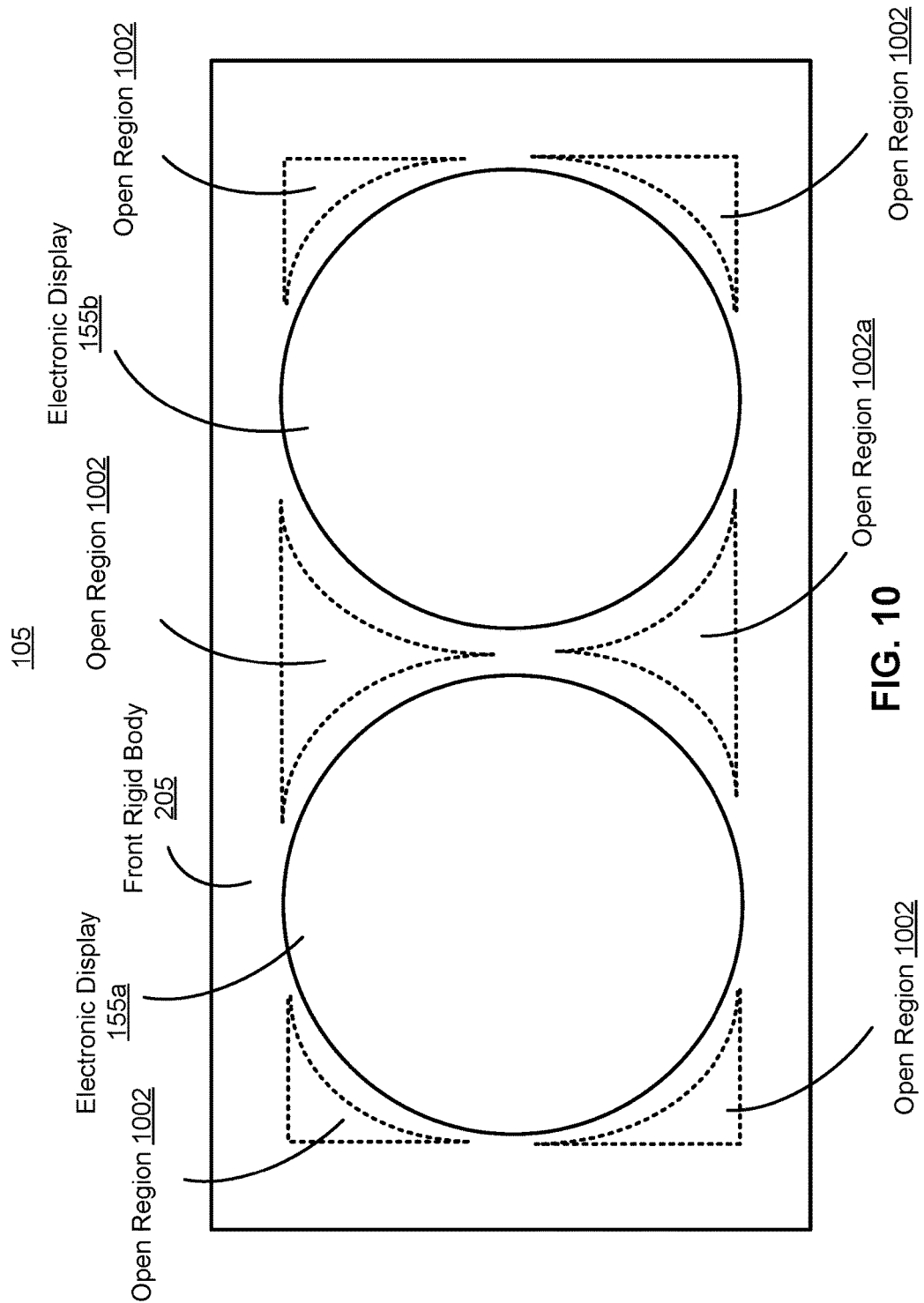
FIG. 10 shows multiple electronic displays within a front rigid body of an HMD, in accordance with some embodiments.

FIG. 10 shows multiple electronic displays 155*a* and 155*b* within a front rigid body 205 of an HMD 105, in accordance with some embodiments. The electronic displays 155*a* and 155*b* are left and right circular LCD displays that each includes a circular LCD panel and circular backlight. A "left" display device refers to a display device that is mounted in the HMD 105 in a first position to provide images to the left eye of the user, and a "right" display device refers to a display device that is mounted in the HMD 105 in a second position to provide images to the right eye of the user. For example, the left and right electronic displays 155*a* and 155*b* are disposed besides each, with the left electronic display 155*a* providing video output to the left eye and the right electronic display 155*b* providing video output to the right eye. The circular shape of the electronic displays 155*a* and 155*b* results in open regions 1002 that can accommodate placement of other components of the HMD. The open region 1002*a* between the electronic displays 155*a* and 155*b* can accommodate placement of the user's nose. In some embodiments, the left electronic display 155*a* has a dedicated left optics block 165 to direct light from the left electronic display 155*a* to the user's left eye, and the right electronic display 155*b* has a dedicated right optics block 165 to direct light from the right electronic display 155*b* to the user's right eye.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A liquid crystal display (LCD) device, comprising:
   an LCD panel; and
   a backlight for illuminating the LCD panel, the backlight disposed behind the LCD panel and including:
      a light guide including a circular top surface, a circular bottom surface, and a connecting side surface between the top surface and bottom surface;
      an array of light emitting diodes (LEDs) disposed along the connecting side surface of the light guide in a circular arrangement to emit light into in first directions toward a center of the light guide, the light guide receiving the light from the array of LEDs in the first directions and directs the light in a second direction toward the LCD panel from the circular top surface; and a brightness enhancement film (BEF) disposed between the light guide and the LCD panel, the BEF including one of concentric circular stripe prisms or radial stripe prisms.

2. The LCD device of claim 1, wherein the LCD panel has a circular profile shape corresponding with a shape of the circular top surface of the light guide to receive the light in the second direction from the circular top surface.

3. The LCD device of claim 1, wherein the BEF includes the concentric circular stripe prisms.

4. The LCD device of claim 1, wherein the BEF includes the radial stripe prisms.

5. The LCD device of claim 1, wherein:
the BEF includes the concentric circular stripe prisms;
the backlight includes another BEF including the radial stripe prisms;
the BEF and the other BEF are disposed between the light guide and the LCD panel with the concentric circular stripe prisms of the BEF crossing the radial stripe prisms of the other BEF.

6. The LCD device of claim 5, wherein each of the BEF and the other BEF includes a circular profile shape corresponding with a shape of the circular top surface of the light guide.

7. The LCD device of claim 1, wherein light guide reduces in thickness from the connecting side surface toward the center of the light guide.

8. The LCD device of claim 1, wherein the light guide includes bumps on the circular top surface or the circular bottom surface to diffuse the light within the light guide, a density of the bumps increasing from the connecting side surface toward the center of the light guide.

9. The LCD device of claim 1, wherein the array of LEDs include a first color LED and a second color LED.

10. The LCD device of claim 1, wherein the backlight further includes a circular reflective surface behind the light guide and a circular optical film stack in front of the light guide.

11. A head-mounted display (HMD), comprising:
a left circular a liquid crystal display (LCD) device and a right circular LCD device, each circular LCD device including:
an LCD panel; and
a backlight for illuminating the LCD panel, the backlight disposed behind the LCD panel and including:
a light guide including a circular top surface, a circular bottom surface, and a connecting side surface between the top surface and bottom surface;
an array of light emitting diodes (LEDs) disposed along the connecting side surface of the light guide in a circular arrangement to emit light into in first directions toward a center of the light guide, the light guide receiving the light from the array of LEDs in the first directions and directs the light in a second direction toward the LCD panel from the circular top surface; and
a brightness enhancement film (BEF) disposed between the light guide and the LCD panel, the BEF including one of concentric circular stripe prisms or radial stripe prisms.

12. The HMD of claim 11, wherein the LCD panel has a circular profile shape corresponding with a shape of the circular top surface of the light guide to receive the light in the second direction from the circular top surface.

13. The HMD of claim 11, wherein the the BEF includes the concentric circular stripe prisms.

14. The HMD of claim 11, wherein the BEF includes the radial stripe prisms.

15. The HMD of claim 11, wherein:
the BEF includes the concentric circular stripe prisms;
the backlight includes another BEF including the radial stripe prisms;
the BEF and the other BEF are disposed between the light guide and the LCD panel with the concentric circular stripe prisms of the BEF crossing the radial stripe prisms of the other BEF.

16. The HMD of claim 15, wherein each of the BEF and the other BEF includes a circular profile shape corresponding with a shape of the circular top surface of the light guide.

17. The HMD of claim 11, wherein light guide reduces in thickness from the connecting side surface toward the center of the light guide.

18. The HMD of claim 11, wherein the light guide includes bumps on the circular top surface or the circular bottom surface to diffuse the light within the light guide, a density of the bumps increasing from the connecting side surface toward the center of the light guide.

19. The HMD of claim 11, further comprising a left optics block to direct light emitted from the left circular LCD device and a right optics block to direct light emitted from the right circular LCD device.

20. The HMD of claim 11, wherein the backlight further includes a circular reflective surface behind the light guide and a circular optical film stack in front of the light guide.

\* \* \* \* \*

UNITED STATES PATENT AND TRADEMARK OFFICE
CERTIFICATE OF CORRECTION

PATENT NO.         : 10,061,073 B2
APPLICATION NO.    : 15/411445
DATED              : August 28, 2018
INVENTOR(S)        : Evan M. Richards, Shizhe Shen and Jianru Shi Page 1 of 1

It is certified that error appears in the above-identified patent and that said Letters Patent is hereby corrected as shown below:

In the Claims

Column 13, Lines 43-44, Claim 11 delete "a left circular a liquid crystal display (LCD) device and a right circular LCD device" and insert --a left circular liquid crystal display (LCD) device and a right circular LCD device--.

Signed and Sealed this
Fifth Day of March, 2019

Andrei Iancu
*Director of the United States Patent and Trademark Office*